Dec. 17, 1940. A. P. WOOD 2,225,361
DYNAMO-ELECTRIC MACHINE
Filed Oct. 6, 1938
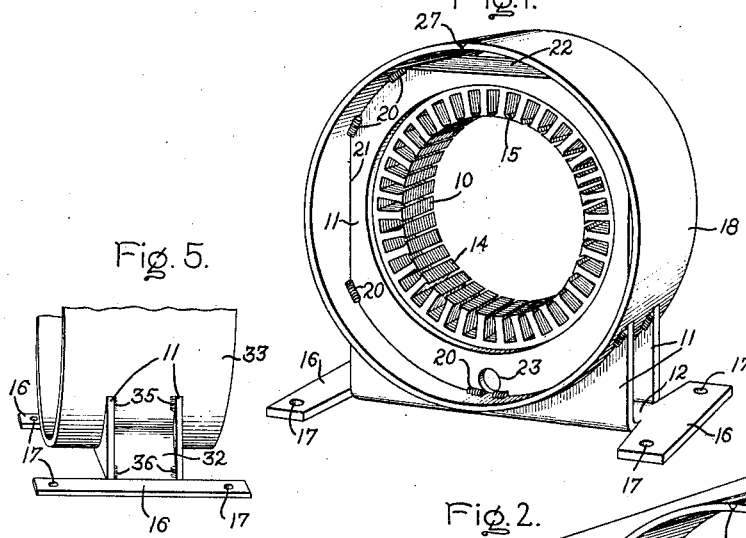
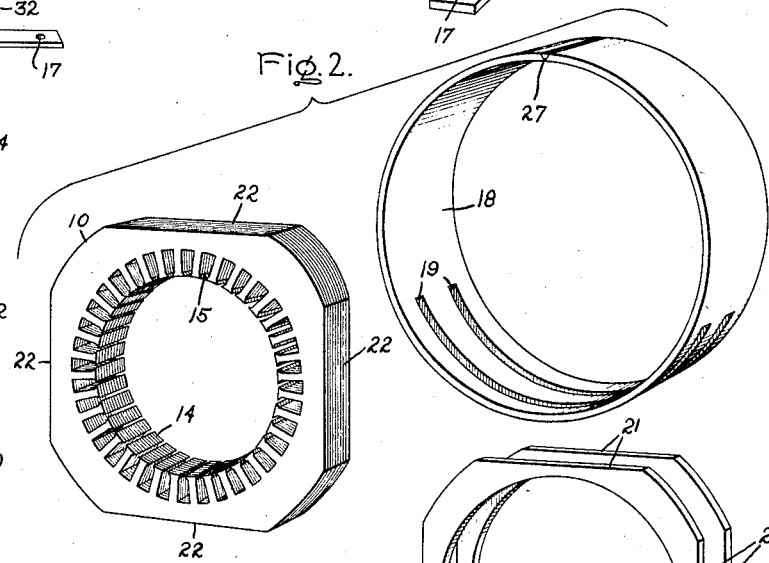
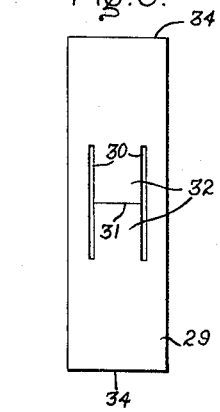
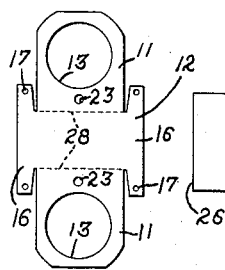
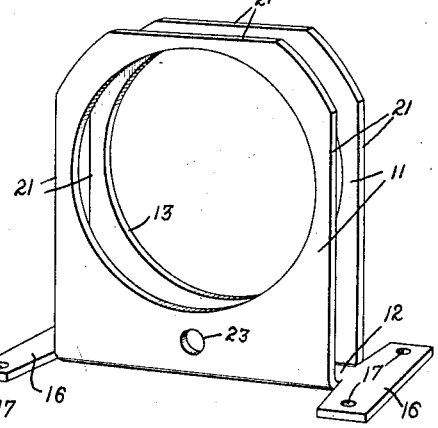
Inventor:
Alexander P. Wood,
by Harry E. Dunham
His Attorney.

Patented Dec. 17, 1940

2,225,361

UNITED STATES PATENT OFFICE 2,225,361

DYNAMO-ELECTRIC MACHINE

Alexander P. Wood, Schenectady, N. Y., assignor to General Electric Company, a corporation of New York Application October 6, 1938, Serial No. 233,575

8 Claims. (Cl. 171—252)

My invention relates to improvements in dynamo-electric machines, and more particularly to a fabricated construction of a stationary member of dynamo-electric machines and a method of making the same.

An object of my invention is to provide an improved and simplified fabricated stationary member for a dynamo-electric machine and a method of making the same.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a perspective view of a stationary member of a dynamo-electric machine embodying my invention; Fig. 2 is an exploded perspective view of the elements of the stationary member shown in Fig. 1; Fig. 3 is a plan view of a sheet metal punching from which the base for the stationary member is made; Fig. 4 is a plan view of a sheet metal punching from which the shell shown in Fig. 1 is made; Fig. 5 is a fragmentary perspective view of a stationary member of a dynamo-electric machine including another embodiment of my invention; and Fig. 6 is a plan view of a sheet metal punching from which the shell shown in Fig. 5 is made.

Referring to the drawing, I have shown my invention in connection with a dynamo-electric machine stationary member, which may be provided with any suitable winding, and which includes a frame for a core structure of assembled laminations 10. These laminations are held in assembled relation by a pair of clamping elements or arms 11 extending angularly from an integral base portion 12 of a U-shaped base. The arms 11 are each formed with a central, substantially circular opening 13 therein, which are axially aligned and arranged over central openings 14 and the winding slots 15 of the laminations 10, so as not to obstruct access thereto. In order to provide for securing the U-shaped base to a supporting structure, a supporting foot 16 is formed integrally with the base portion 12 and the arms 11, on each side of the base portion 12 adjacent the outer edges at the base of the two parallel arms 11. Each foot is formed with a pair of openings 17 through which securing bolts may be placed.

In the construction shown in Figs. 1, 2, and 4, the arms 11 of the base and the laminated core 10 are arranged within a substantially cylindrical sheet metal shell 18 formed with a pair of substantially parallel circumferentially extending openings 19 arranged adjacent the outer sides of the laminated core 10. The arms 11 are formed of substantially the same width as the chord of the arc of the circumferential openings 19 and extend through this pair of openings 19 about the laminated core 10 and are rigidly secured to the interior of the shell 18 by welding at spaced apart points 20. In the arrangement shown in Fig. 1, the bolts for securing the end shield to the stationary member may be passed through the openings between the cylindrical shell and the straight sides 21 of the arms 11 and the straight sides 22 of the laminated core 10. Each of the arms 11 also is formed with an opening 23 adjacent the base portion 12 of the supporting base, and these openings 23 are arranged to communicate with the open space between the shell 18 and the straight side 22 on the bottom of the laminated core 10, so as to provide for the passage of a bolt therethrough.

In fabricating my improved stationary member, I form the two principal parts of the stationary member from substantially rectangular sheet metal blanks as shown in Figs. 3 and 4. The substantially cylindrical shell 18 is formed by punching a substantially rectangular sheet metal blank 24 with a pair of longitudinally extending openings or slots 25 therein. This rectangular sheet 24 is then rolled into substantially cylindrical form and the two transverse ends 26 are welded together at 27 as shown in Fig. 2. This provides a substantially cylindrical shell with a pair of parallel circumferentially extending openings 19 therein. The base also is formed from a substantially rectangular sheet metal blank and is punched as shown in Fig. 3 to provide a pair of longitudinally extending arms 11 with a circular opening 13 in each of these arms of slightly greater size than the central opening 14 and the slots 15 of the laminations 10. The inner ends of each of these arms 11 are joined to a transversely extending base portion 12, on each end of which is formed a supporting foot 16 extending longitudinally of the punching. The bolt holes 23 in the arms 11 and the bolt holes 17 in the feet 16 also may be punched simultaneously with the punching of the legs 11, arms 16, and openings 13 in the arms 11. After the punching operation, the arms 11 are bent at their inner edges 28, shown in dotted lines in Fig. 3, angularly and substantially at right angles to the base portion 12.

In fabricating the stationary member, the laminations are assembled to form the core structure 10, and are then placed within the cylindrical shell 18 axially thereof so that the pair of openings 19 are adjacent the outer sides of the core 10. The arms 11 of the base are then placed through the openings 19 about the assembled core 10 so as to retain the laminations in assembled relation in the shell. In order to form a rigid structure of this simple construction, the shell 18 is welded to the arms 11 at the spaced apart points 20 along the inner periphery of the shell, as shown in Fig. 1.

In Figs. 5 and 6, I have shown another embodiment of my invention, wherein the shell is punched as a substantially rectangular sheet metal blank 29 having a pair of substantially parallel longitudinally extending openings or slots 30 therein. The sheet is severed or cut transversely at 31 intermediate the openings 30 to form a pair of longitudinally extending tongues 32 between the openings 30, as shown in Fig. 6. This rectangular sheet 29 is then rolled into a substantially cylindrical shell 33 and the transverse ends 34 thereof are welded together in a manner similar to that shown in Figs. 1 and 2. The tongues 32 then are bent angularly outwardly with respect to the shell 33 to provide a single relatively large opening between the punched openings or slots 30 which is adapted to receive the laminated core 10 and the base arms 11. As explained with respect to the arrangements shown in Figs. 1 to 4, inclusive, the clamping elements or base arms 11 are formed with substantially the same width as the chord of the arc of the circumferential opening formed in the shell 33 when the tongues 32 have been bent angularly outwardly. In this construction, the base is formed in the same manner as explained with respect to Figs. 1 to 4, inclusive, but in assembling the stationary member, the laminated core 10 is arranged between the arms 11 with the openings 13 in the arms over the corresponding openings 14 and the winding slots 15 in the laminations 10. The assembled core and base arms 11 are then inserted through the opening formed in the shell 33 between the tongues 32, and the arms 11 are welded at spaced apart points to the inner periphery of the shell 33 in a manner similar to that shown in Fig. 1. The outwardly turned tongues 32 then are welded to the arms 11 adjacent the inner corners 35 and outer corners 36.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States, is:

1. A stationary member for a dynamo-electric machine or the like, including an assembly of laminations forming a core structure, a shell about said core having a pair of openings formed therein adjacent the outer sides of said core, and a base having a single base portion extending across said stationary member beyond each side thereof and a pair of arms integral therewith and extending through said shell openings and about said core to retain said laminations in assembled relation.

2. A stationary member for a dynamo-electric machine or the like including an assembly of laminations forming a core structure, a shell about said core, having a circumferentially extending opening therein, and a base having a pair of arms of substantially the same width as the chord of said circumferential opening and extending through said shell opening and about said core to retain said laminations in assembled relation in said shell.

3. A stationary member for a dynamo-electric machine or the like including an assembly of laminations forming a core structure, a shell about said core having a pair of substantially parallel circumferentially extending openings formed therein adjacent the outer sides of said core, a substantially U-shaped base having a single piece base portion and a pair of arms extending therefrom through said shell openings and about said core to retain said laminations in assembled relation in said shell, and a supporting foot arranged on each side of said base and formed integral with said arms.

4. A stationary member for a dynamo-electric machine or the like including an assembly of laminations having a central opening therethrough and forming a core structure, a shell about said core having a pair of substantially parallel circumferentially extending openings formed therein adjacent the outer sides of said core, and a base formed of a single piece base portion and including a pair of arms having openings therein and extending through said shell openings about said core with said openings in said arms over the openings in said laminations and arranged to retain said laminations in assembled relation in said shell.

5. The method of fabricating a stationary member for a dynamo-electric machine or the like comprising assembling a group of laminations to form a core, forming a substantially rectangular sheet with a pair of parallel openings therein, forming a shell with said sheet, arranging said core in said shell, forming a U-shaped base with a pair of arms extending angularly from the base portion thereof, and arranging said base arms through said shell openings and about said core to retain said core in assembled relation in said shell.

6. The method of fabricating a stationary member for a dynamo-electric machine or the like comprising assembling a group of laminations to form a core, forming a substantially rectangular sheet with a pair of parallel longitudinally extending openings therein, forming a substantially cylindrical shell with said sheet having said openings in circumferentially extending relation, forming a U-shaped base with a pair of arms extending angularly from the base portion thereof, arranging said core in said shell, and arranging said base arms through said shell openings and about said core to retain said core in assembled relation in said shell.

7. The method of fabricating a stationary member for a dynamo-electric machine or the like comprising assembling a group of laminations to form a core, forming a substantially rectangular sheet with a pair of parallel longitudinally extending openings therein and severing the sheet transversely intermediate the openings therein to form a pair of tongues between the openings, forming a shell with said sheet having said openings in circumferentially extending relation, forming a base with a pair of arms extending angularly from the base portion thereof, arranging said core on said base between said arms, arranging said tongues angularly with respect to said shell to provide a single opening extending between and including said pair of openings adapted to receive said core and said base arms, placing said base arms and said core through said shell opening between said tongues, and rigidly securing said base to said shell to retain said stationary member in assembled relation.

8. A method of fabricating a stationary member for a dynamo-electric machine or the like comprising assembling a group of laminations to form a core, forming a substantially rectangular sheet of metal with an opening therein, forming a shell with said sheet, arranging said core in said shell, forming a base having a base portion and a pair of arms extending angularly from the base portion thereof, and passing said base arms through said shell opening and about said core to retain said core in assembled relation in said shell.

ALEXANDER P. WOOD.